United States Patent [19]
Maes et al.

[11] Patent Number: 6,016,476
[45] Date of Patent: Jan. 18, 2000

[54] PORTABLE INFORMATION AND TRANSACTION PROCESSING SYSTEM AND METHOD UTILIZING BIOMETRIC AUTHORIZATION AND DIGITAL CERTIFICATE SECURITY

[75] Inventors: Stephane Herman Maes, Danbury, Conn.; Jan Sedivy, Praha, Czechoslovakia

[73] Assignee: International Business Machines Corporation, Armonk, N.Y.

[21] Appl. No.: 09/008,122

[22] Filed: Jan. 16, 1998

Related U.S. Application Data
[60] Provisional application No. 60/055,418, Aug. 11, 1997.

[51] Int. Cl.$^7$ .............................. H04L 9/32; G06F 157/00
[52] U.S. Cl. .................................. 705/1; 705/26; 705/42; 705/44; 380/23; 380/25
[58] Field of Search ..................................... 704/270, 275; 705/26, 35–38; 710/11; 713/200; 380/21, 25, 30, 24, 9, 23

[56] References Cited

U.S. PATENT DOCUMENTS

| | | | |
|---|---|---|---|
| 4,274,139 | 6/1981 | Hodgkinson et al. | 709/203 |
| 4,653,097 | 3/1987 | Watanabe et al. | 704/272 |
| 5,127,043 | 6/1992 | Hunt et al. | 379/88.02 |
| 5,181,238 | 1/1993 | Medamana et al. | 379/93.03 |
| 5,216,720 | 6/1993 | Naik et al. | 704/272 |
| 5,274,695 | 12/1993 | Green | 379/88.02 |
| 5,365,574 | 11/1994 | Hunt et al. | 379/88.02 |
| 5,465,290 | 11/1995 | Hampton et al. | 379/88.02 |
| 5,499,288 | 3/1996 | Hunt et al. | 379/88.02 |

(List continued on next page.)

OTHER PUBLICATIONS

IBM Tech. Discl. Bulletin vol. 37 #92B Feb. 1994 p. 189 "VoicePrint Security for Credit Cards" Anon.

Information Week Aug. 18, 1997 p. 36 Anon. "Biometrics—Body Language—Fingerprints, Faces, Even Eyes are The New Keys to Protecting . . . ".

*Primary Examiner*—James P. Trammell
*Assistant Examiner*—Cuong H. Nguyen
*Attorney, Agent, or Firm*—F. Chau & Associates, LLP

[57] ABSTRACT

The present invention is a portable client PDA with a touch screen or other equivalent user interface and having a microphone and local central processing unit (CPU) for processing voice commands and for processing biometric data to provide user verification. The PDA also includes a memory for storing financial and personal information of the user and I/O capability for reading and writing information to various cards such as smartcards, magnetic cards, optical cards or EAROM cards. The PDA includes a Universal Card, which is common generic smartcard with a unique imprint provided by a service provider, on which selected financial or personal information stored in the PDA can be downloaded to perform certain consumer transactions. The PDA includes a modem, a serial port and/or a parallel port so as to provide direct communication capability with peripheral devices (such as POS and ATM terminals) and is capable of transmitting or receiving information through wireless communications such as radio frequency (RF) and infrared (IR) communication. The present invention is preferably operated in two modes, i.e., a client/server mode and a local mode. The client/server mode is periodically performed to download a temporary digital certificate (which is necessary to access selected information stored in the PDA and to write such information to the Universal Card) from a central server of the service provider of the PDA and Universal Card. Next, the local mode of operation is performed by providing the PDA with biometric data and selecting one of the pre-enrolled credit cards that are stored in the PDA. Upon biometric verification, the Universal Card is written with the selected card information, which is then used to initiate a consumer transaction. In the absence of an unexpired digital certificate, however, the selected card information will not be written to the Universal Card, notwithstanding that the user may have passed local biometric verification.

20 Claims, 5 Drawing Sheets

U.S. PATENT DOCUMENTS

| | | | |
|---|---|---|---|
| 5,513,272 | 4/1996 | Bogosian, Jr. | 382/116 |
| 5,517,558 | 5/1996 | Schalk | 379/88.02 |
| 5,657,389 | 8/1997 | Houvener | 380/23 |
| 5,696,827 | 12/1997 | Brands | 380/30 |
| 5,721,781 | 2/1998 | Deo et al. | 380/25 |
| 5,742,845 | 4/1998 | Wagner | 705/26 |
| 5,796,832 | 8/1998 | Kawan | 380/24 |
| 5,825,880 | 10/1998 | Sudia et al. | 380/21 |
| 5,852,811 | 12/1998 | Atkins | 705/36 |
| 5,892,900 | 4/1999 | Ginter et al. | 713/200 |
| 5,893,063 | 4/1999 | Loats et al. | 704/275 |

# PORTABLE INFORMATION AND TRANSACTION PROCESSING SYSTEM AND METHOD UTILIZING BIOMETRIC AUTHORIZATION AND DIGITAL CERTIFICATE SECURITY

This application is based on a provisional application Ser. No. 60/055,418, filed on Aug. 11, 1997.

BACKGROUND OF THE INVENTION

The present invention relates to a portable information and transaction processing system and method and, more particularly, to a portable information and transaction processing system and method which utilizes digital certificate security and biometric authorization to provide personal verification prior to processing user requested financial transactions and providing personal information.

It is now widely accepted in the domestic consumer market that purchasing or selling goods or services with credit cards at point of sale (POS) terminals, as well as performing electronic transfer of funds at automated teller machine (ATM) terminals using ATM cards, is more efficient than using cash to pay for goods or services or paying debts. Utilizing cash as a means for purchasing goods or paying debts is generally viewed as burdensome for several reasons. First, in terms of accounting, the consumer must manually generate records and reconcile his or her accounts to keep track of such cash transactions. By utilizing a credit card issued by a financial institution, however, consumer transactions are recorded by such financial institution and accountings are provided to the consumer on a monthly basis, which provides improved accounting and reconciliation.

In addition, using cash is a financially insecure method for protecting consumers against fraud and theft. For example, if a consumer believes that he or she has been sold an inferior or over-priced product, which frequently occurs during quick consumer transactions where the consumer may not have adequate time to reflect on the purchase until some time after such purchase, it is much easier for the consumer to contact the financial institution to stop payment on goods purchased using a credit card than it is for the user to recover cash from the merchant from whom such goods were bought. Moreover, it is virtually impossible for a consumer to recover cash that has been stolen or lost. On the other hand, if the consumer's credit cards are stolen or lost, the consumer can contact the corresponding financial institution to cancel such cards and obtain new credit card accounts.

Accordingly, there is a strong trend today in moving towards a "cashless society," which has caused a substantial increase in the use of credit cards, ATM cards and direct debit cards (collectively, "financial cards") for performing consumer transactions. Notwithstanding the perceived benefits of using financial cards rather than cash, there exists several disadvantages in using these cards. For example, if the consumer frequently uses a significant number of financial cards, the consumer must physically possess all such cards in order to access a desired account. Having to carry such a large number of financial cards can be extremely burdensome to the consumer since a substantial amount of space is occupied by these cards in the consumer's wallet or purse. Moreover, if the wallet or purse is lost or stolen, the consumer must contact the financial institution for each financial card to cancel the account so as to prevent an unauthorized user from transacting business with such cards, which is also a burdensome task.

Another disadvantage in using financial cards is that consumers are not fully protected from the unauthorized use of lost or stolen cards. For example, a merchant can confirm the ownership of a credit card during a consumer transaction by comparing the authorized signature that is (or should be) written on the back of the credit card with the signature of the person signing the credit card receipt. Realistically, merchants generally do not compare these signatures during such a transaction, and even if they do, they may not compare such signatures with the level of scrutiny or skill needed to distinguish minor differences between the consumer's signature and the unauthorized user's forged signature. Therefore, during the period of time between the time the consumer's credit card is lost or stolen and the time the consumer realizes such loss or theft and cancels the account, an unauthorized user who has found or stolen the card may charge a substantial amount of money to the consumer's card, leaving the consumer with the burden of having to dispute such unauthorized charges with the financial institution.

SUMMARY OF THE INVENTION

It is therefore an object of the present invention to provide a portable information and transaction processing device ("personal digital assistant" or "PDA") in which a user can store his or her credit card, ATM card and/or debit card (i.e., financial) information, as well as personal information, and then access and write selected information to a smartcard ("Universal Card"), which is then used to initiate a POS, ATM, or consumer transaction.

It is another object of the present invention to provide a PDA device which utilizes biometric security to provide user verification prior to accessing and writing the selected financial and personal information to the Universal Card.

It is yet another object of the present invention to provide a PDA device with digital certificate security, whereby the user is required to periodically download a temporary digital certificate from a central server of the service provider of such Universal Card into the PDA device prior to accessing and writing the selected financial and personal information to the Universal Card.

It is still another object of the present invention to provide a PDA device with digital certificate security which is compatible with the current infrastructure (i.e., immediately employed without having to change the existing infrastructure) and which brings biometric security to electronic data transfer systems that are currently unable to perform biometric verification.

It is yet another object of the present invention to provide a PDA device with digital certificate security which can be extended to all applications or systems wherein magnetic and/or smartcards are used such as access control cards for accessing a device service or building, cash cards for performing ATM transactions, calling cards or cellular cards (for e.g., GSM (Group Special Mobile) digital cellular mobile radio system) for making telephone calls and employee cards for accessing confidential information.

In one aspect of the present invention, a portable information and transaction processing device, comprises: central processing unit for controlling the functioning and for processing a plurality of operations of the device; memory means, operatively coupled to the central processing unit, for storing financial and personal information and for storing a temporary digital certificate; communication means, operatively coupled to the central processing unit, for establishing a communication link with a central server at a remote location to obtain the temporary digital certificate; user interface means, operatively coupled to the central processing means, for initiating at least one of the plurality of operations of the device and selecting a portion of one of the financial and personal information from the memory means; a universal card, detachably coupled to the central processing unit, for receiving the selected portion of one of the financial and personal information; and programming means, operatively coupled to the central processing unit and responsive to the temporary digital certificate, for writing the selected portion of one of the stored financial and personal information to the universal storage card, whereby the programming means is prevented from writing the selected portion of one of the financial and personal information to the universal card when the temporary digital certificate is invalid.

The present invention is a portable client PDA with a touch screen or other equivalent user interface, which includes a microphone and a local central processing unit (CPU) for processing voice activated commands and for processing biometric data to provide biometric verification of a user. The present invention includes a memory for storing financial and personal information of the user and I/O capability for writing and reading information to and from various cards such as smartcards, magnetic cards, optical cards or EAROM (electrically alterable read-only memory) cards. The present invention includes a Universal Card, which is a common generic smartcard with a unique imprint (i.e., an account number) provided by a service provider, on which selected financial or personal information stored in the PDA can be downloaded to perform various transactions. The PDA preferably includes a modem and a serif l port and/or a parallel port so as to provide direct communication capability with peripheral devices. The PDA is also capable of transmitting or receiving information through wireless communications such as radio frequency (RF) and infrared (IR) communication.

The present invention is preferably operated in two modes, i.e., a client/server mode and a local mode. The client/server mode is periodically performed to download a temporary digital certificate from a central server of the service provider of the PDA and Universal Card. The client/server mode is performed by establishing communication between the PDA and a central server of the service provider via modem or wireless communication. Once communication is established, the central server verifies the user either biometrically or through PIN or password or a combination thereof, and then generates a temporary digital certificate which is downloaded into the PDA. A temporary, unexpired digital certificate is necessary to access selected information stored in the PDA and write such information to the Universal Card.

Next, the local mode of operation of the PDA is performed to initiate a consumer transaction. Preferably, in the local mode, the user selects one of the pre-enrolled credit cards that are stored on the PDA by stating a verbal command into the microphone of the PDA, whereby the CPU processes the verbal command and performs user verification. Alternatively, user verification (i.e, local verification) may be performed by using either biometric data, PIN or password, or a combination thereof. Upon local verification, the selected information is retrieved from memory and written to the Universal Card which is then available to commence a transaction. In the absence of an unexpired digital certificate, however, the selected information will not be written to the Universal Card notwithstanding that the user may have passed local verification.

The present invention advantageously eliminates the burden of having to carry a multitude of financial cards and/or credit cards that a user may frequently utilize. The financial information for each card may be stored in the PDA and written to the Universal Card when needed. If the Universal Card is lost or stolen, the user will only have to contact the service provider to cancel and reissue a new account. In addition, due to the biometric and digital certificate security which protects against the unauthorized access to the user's financial and personal information, a lost or stolen Universal Card is useless to an unauthorized user.

Further, the present invention may be immediately employed without the need for changes in the existing infrastructure since the PDA and Universal Card may be utilized with any system which utilizes magnetic cards or smartcards for electronic data transfer such as point of sale (POS) terminals or automated teller machines (ATM) which provide direct debit capability.

These and other objects, features and advantages of the present invention will become apparent from the following detailed description of illustrative embodiments, which is to be read in connection with the accompanying drawings.

DETAILED DESCRIPTION OF PREFERRED EMBODIMENTS

Figure 1:
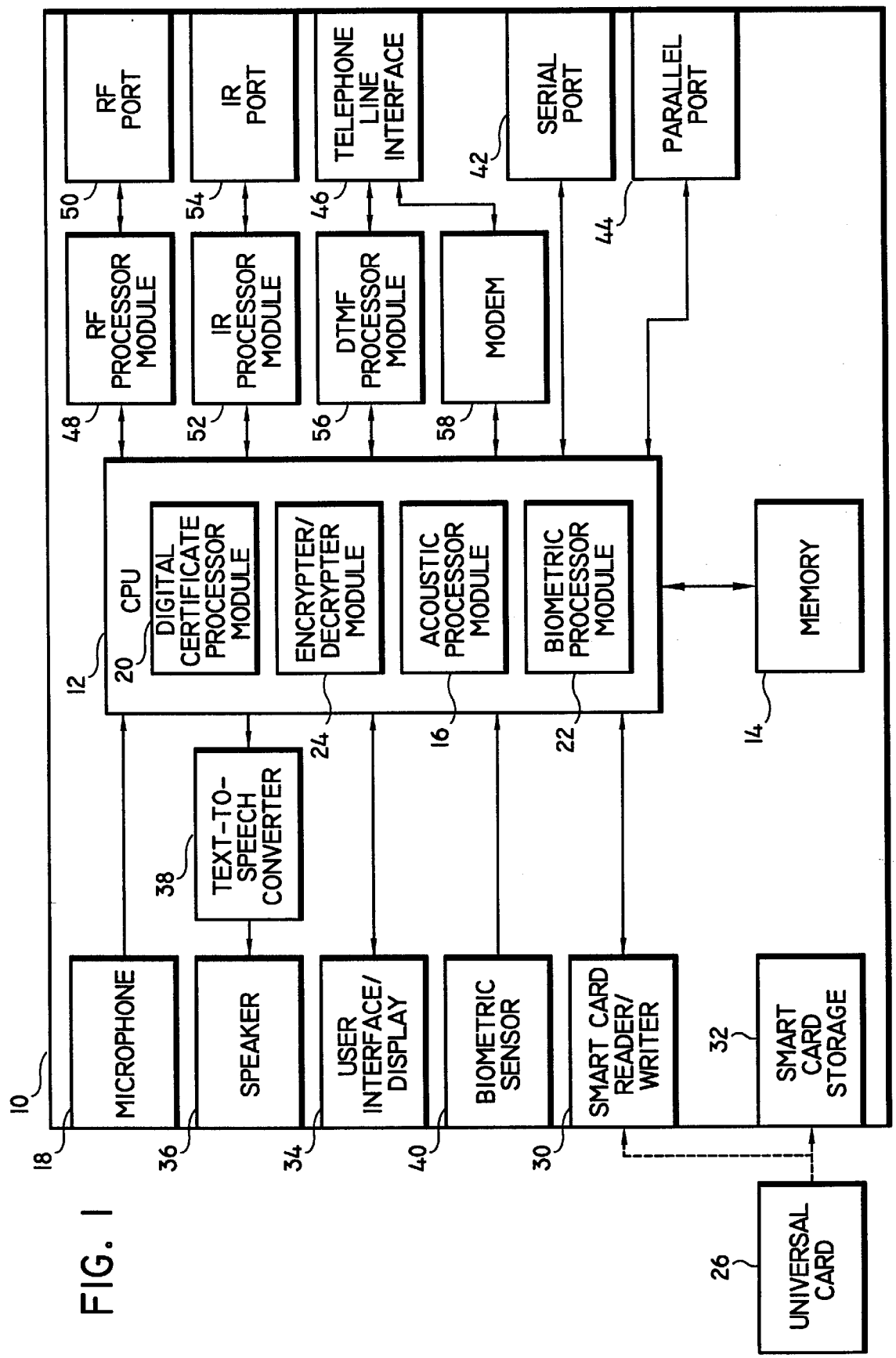
FIG. 1 is a block diagram illustrating elements of a portable information and transaction processing device according to an embodiment of the present invention.

It is to be understood that same or similar components illustrated throughout the figures are designated with the same reference numeral. It is to be further understood that the elements or functional modules described herein in accordance with the present invention may be implemented in various forms of hardware, software, or a combination thereof. Preferably, the main biometric verification elements and speech recognition elements are implemented in software and may include any suitable and preferred processor architecture for practicing the invention by programming one or more general purpose processors. It is to be further understood that, because some of the components of the invention described wherein are preferably implemented as software modules, the actual connections shown in the figures may differ depending upon the manner in which the invention is programmed. Of course, special purpose processors may be employed to implement the invention. Given the teachings of the invention herein, one of ordinary skill in the related art will be able to contemplate these and similar implementations of the elements of the invention.

Referring initially to FIG. 1, a block diagram illustrating elements of the portable information and transaction processing (PDA) device 10 according to an embodiment of the present invention is shown. The heart of the device is a central processing unit (CPU) 12, which controls the operations of the PDA device 10 via programs stored in a memory 14 and executed by the CPU 12. Specifically, the CPU 12 includes an acoustic processor module 16 for processing voice commands inputted into the PDA device 10 through a microphone 18. The acoustic processor module 16 is also used for performing local speaker verification. The CPU 12 also includes a digital certificate processor module 20, for processing a digital certificate obtained in the client/server mode of operation (to be discussed in detail below), and a biometric processor module 22 for processing biometric data in addition to, or alternative to voice data, to provide user verification. The CPU 12 further includes an encrypter/decrypter module 24 for encrypting the personal and financial information before being stored in memory 14 and for decrypting such information when accessed by the user. Although the illustrative embodiment herein shows the CPU 12 comprising the digital certificate module 20, the encrypter/decrypter module 24, the acoustic processor module 16 and the biometric processor module 22, it is to be understood that such modules may also be implemented as special purpose modules each having a processor, associated memory and stored programs for performing such functions.

The PDA device 10 includes a smartcard reader/writer 26 (as is known in the art) for reading and writing information to and from various cards, e.g., magnetic cards, IC cards and/or EAROM cards (using known standards and techniques). During the local mode of operation of the PDA device 10, a Universal Card 26 of the present invention is inserted into the smartcard reader/writer 30 and, upon user verification, selected financial or personal information is written to the Universal Card 26. When not in use, the Universal Card 26 may be stored in a smartcard storage compartment 32 of the PDA device 10.

The PDA device 10 includes a user interface/display 34, which is preferably a liquid crystal display (LCD) touch screen display (or equivalent user interface), for displaying and/or inputting data associated with the operations or functions of the PDA device 10. Alternatively, the interface/display 24 may be comprised of a keyboard and a conventional LCD display. Additionally, the PDA device 10 may audibly communicate with or request information from the user through a speaker 26 which is operatively connected to the CPU 12 via a text-to-speech converter 38. The text-to-speech converter 38 converts signals from the CPU 12 into synthesized speech which is then heard through the speaker 36. The PDA device 10 may be configured to simultaneously display such information along with generating the synthesized speech. Furthermore, the PDA device 10 may operate without a display (or a limited display) and rely on the text-to-speech functions to communicate information to the user of such device.

A biometric sensor 40 of any conventional type may also be provided for collecting biometric data (other than voice data which is received by the microphone 18) such as a finger, thumb or palm print, a handwriting sample, a retinal vascular pattern, or a combination thereof, to provide biometric verification as an alternative to, or in addition to, voice biometric verification. This data is then processed by the biometric processor module 22 to provide user verification (i.e., biometric security) prior to accessing the financial and personal information stored in memory 14. It is to be appreciated by one of ordinary skill in the art that the biometric verification features of the PDA device may be replaced or supplemented with a PIN (personal identification number) or password to provide user verification.

The PDA device 10 may preferably be equipped with various communication ports such as a serial port 42 and a parallel port 44 (utilizing known computer interface standards), operatively coupled to the CPU 12, as well as a telephone line interface 46 (using a known interface connections), to provide means for establishing a communication link between the PDA device 10 and other peripheral devices such as computers, modems and printers. For establishing wireless communication, the device may preferably be equipped with an RF processor module 48, operatively connected between the CPU 12 and an RF port 50, for processing incoming RF information received by the RF port 50, and for generating transmission signals which are outputted from the RF port 50 using conventional constructions and techniques. The device may also be equipped with an IR processor module 52, operatively connected between the CPU 12 and an IR port 54, for processing incoming optical information and for generating output optical signals using conventional constructions and known techniques. Preferably, the PDA device 10 includes a DTMF (dual tone multi-frequency) processor module 56 and a modem 58, operatively coupled between the CPU 12 and the telephone line interface 46. Communication of financial information may be accomplished via modem communication and/or DTMF tone communication on a telephone line, using known methods. DTMF communication may be used for processing PINs for user verification and authorization.

Figure 2:
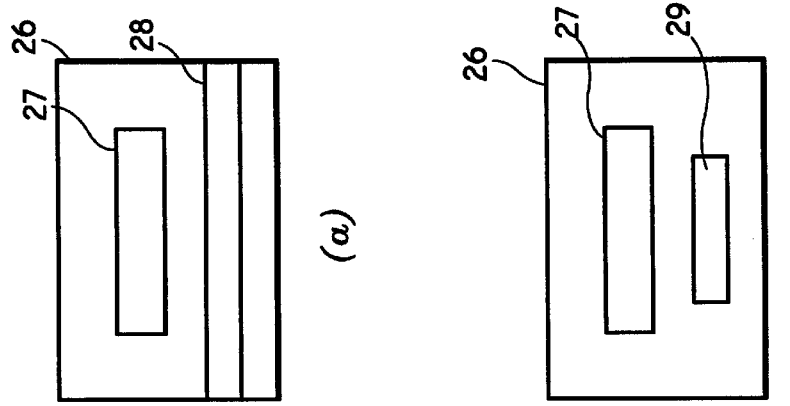
FIGS. 2a and 2b are diagrams of the Universal Card according to an embodiment of the present invention.

Referring now to FIGS. 2a and 2b, diagrams of the Universal Card 26 according to an embodiment of the present invention are shown. The Universal Card 26 is essentially a generic smartcard which includes either a magnetic band 28 (FIG. 2a) or integrated chip (IC) 29 (FIG. 2b), or both, for storing the selected information which is retrieved from the memory 14 and written to the Universal Card 26 through the smartcard reader/writer 30 during the local mode of operation of the PDA device 10. The Universal Card 26 (issued by a service provider) contains a unique Universal Card number 27 imprinted thereon, which corresponds to the designated user account number provided by the service provider (which is analogous to the account number provided on a credit card or ATM card).

As more fully discussed below, the Universal Card number 27 may be utilized to provide user verification in consumer POS transactions utilizing a traditional mechanical sweeper instead of a magnetic sweeper which is capable of magnetically reading the magnetic band 28 of the Universal Card 26. The unique Universal Card number 27 may also be used for to provide user verification in instances where consumer transactions are performed remotely over a telephone. In such instance, as explained below, an authorization number, which is unique to the current digital certificate, will be displayed on the PDA device 10 upon user verification. The authorization number, together with the unique Universal Card number 27, may be used to verify the user.

Figure 3:
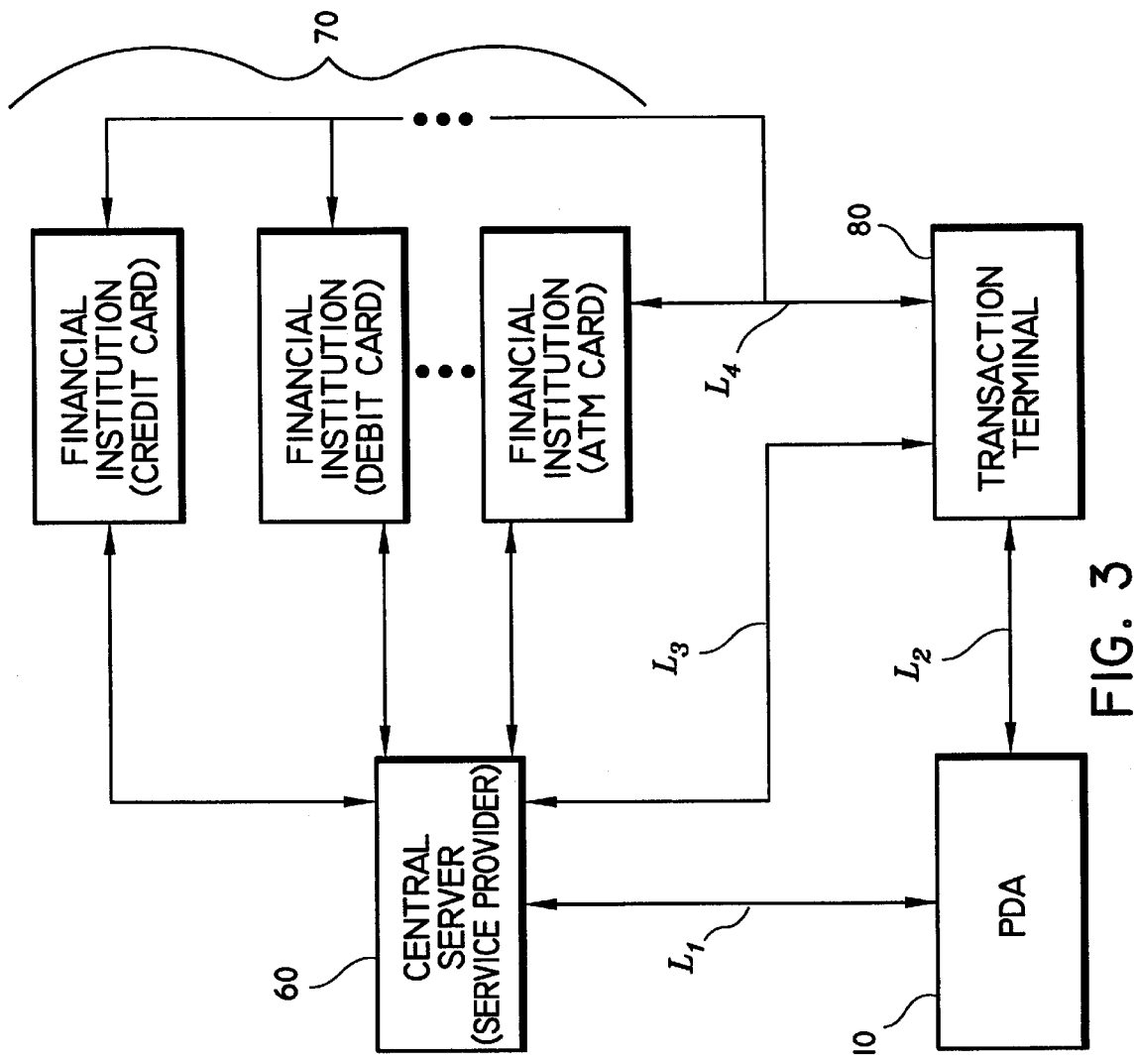
FIG. 3 is a block diagram showing the interaction of the portable information and transaction processing device in connection with processing a transaction according to the present invention.

Referring to FIG. 3, a block diagram illustrating the interaction of the PDA device 10 in connection with processing a transaction according to the present invention is shown. The user of the PDA device 10 and Universal Card 26 (FIGS. 1 and 2) must first perform an enrollment procedure with a service provider. Enrollment involves obtaining a Universal Card 26 with a designated account number (i.e., the unique imprint 27 on the Universal Card 26) and providing the service provider with the user's credit card or ATM card information so that such information can be verified with the financial institutions 70 that issued such cards. This information is then stored on a central server 60 of the service provider. The user may then subsequently download such information into the PDA device 10 by establishing a communication link (L1) with the central server 60. Alternatively, the credit cards or ATM cards may be loaded into the PDA device 10 by directly reading information contained on such cards through the smartcard reader/writer 30 of the PDA device 10. In such a situation, the PDA device 10 will compare the user ID of the credit cards with the user ID of the PDA device to verify the user so as to prevent a user from downloading the information from cards owned by another person into the user's PDA device 10. In the event that the PDA device is unable to verify the owner of a card which is being directly downloaded via the smartcard reader/writer 30 (i.e., the card does not contain the name of its owner), the user will be required to enroll the card by providing the service provider with the card information (to obtain verification from the appropriate financial institution) and then connect to the central server 60 to download the card information.

Enrollment also involves providing the service provider with personal information such as the user's social security number, address, maiden name and date of birth, which is stored on the central server 60. Such information is then used to verify the user during the client/server mode prior to the issuance of a digital certificate. A personal identification number PIN and the Universal Card 26 with a unique account number 27 is provided by the service provider. This information, as well as biometric data such as voice prints (models) of the user, are also stored in central server 60 of the service provider for user verification during the client/server mode to obtain a digital certificate (to be discussed in detail below). The central server 60 is a computer which is programmed to perform the functions described herein such as biometric verification, speech recognition and generating and downloading a temporary digital certificate.

Figure 4:
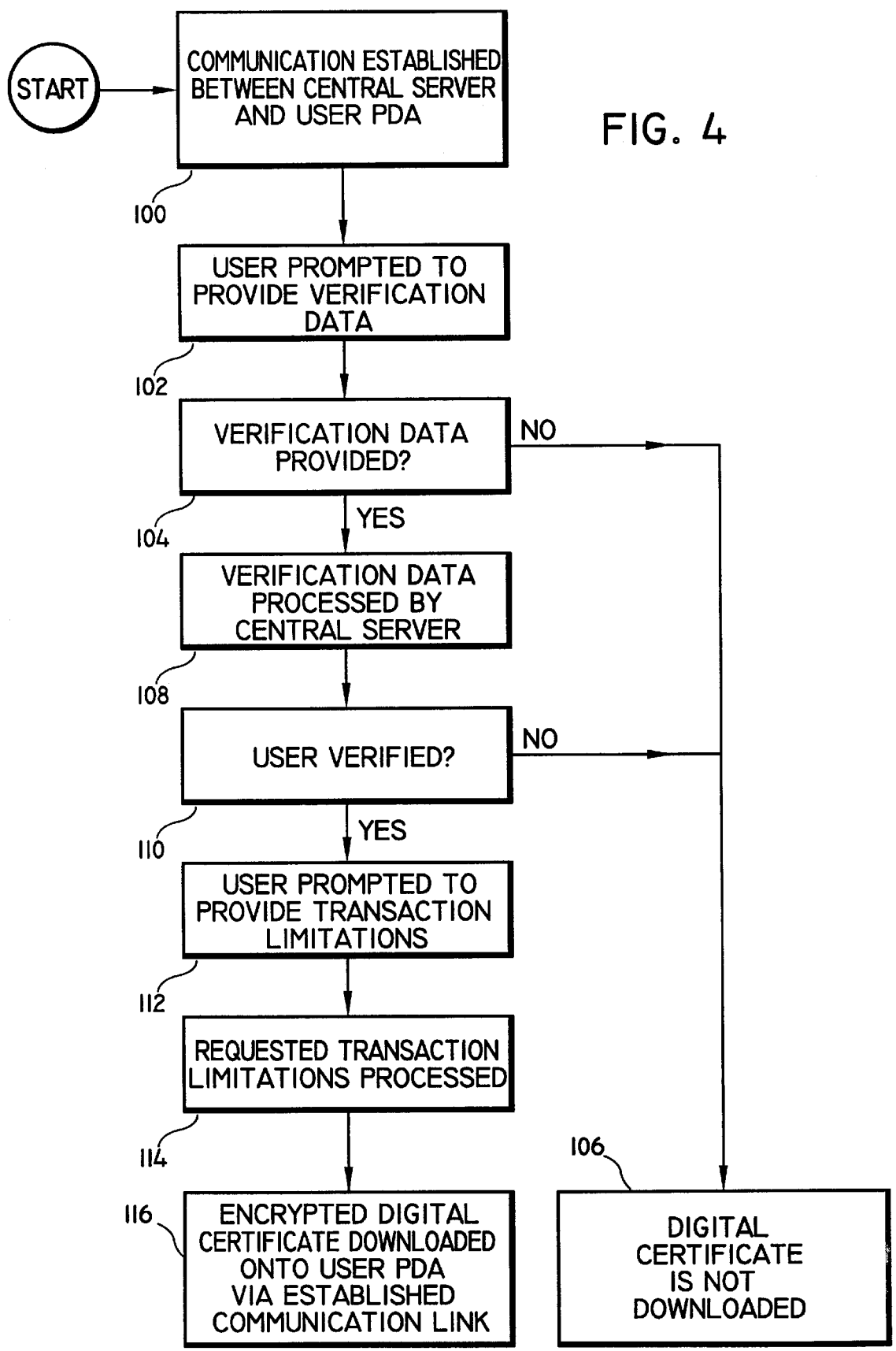
FIG. 4 is a flow diagram illustrating the client/server mode of operation in accordance with the present invention.

Referring to FIGS. 1, 3 and 4, the client/server operating mode of the present invention is now described. As indicated above, the user must periodically connect the PDA device 10 with the central server 60 of the service provider (Link L1, FIG. 3) in order to obtain a valid digital certificate from the central server 60 prior to initiating a consumer transaction. Specifically, the digital certificate is binary encrypted file that must be downloaded into the PDA device 10 before personal or financial information of the user can be written to the Universal Card 26. The digital certificate contains information relating to (but not limited to) the account number of the PDA device 10, the date on which the digital certificate was authenticated and its expiration date, as well as any constraints which exist for each enrolled card. The digital certificate is stored in the memory 14 of the PDA device 10. Prior to the execution of a transaction (i.e., downloading selected card information from the memory 14 to the Universal Card 26), the digital certificate is decrypted by the encrypter/decrypter module 24 and loaded into the digital certificate processor module 20 wherein it is processed to determine if it is valid.

In order to obtain the digital certificate, the user must establish a communication link (Link L1, FIG. 3) with the central server 60 of the service provider (step 100, FIG. 4). Communication may be established by dialing into the central server 60 through a telephone line via the modem 58 and telephone line interface 46. It is also contemplated by the present invention that communication may be established with the central server 60 through a digital communication channel such as internet, intranet or local area network. Alternatively, communication between the PDA device 10 and the central server 60 may be established through wireless communications, e.g., via the RF port 50 and the RF processor module 48. Further, the PDA device 10 may be connected to the central server via a special ATM (or other such kiosks) which uses intranet and TCP/IP to connect to the central server 60. It is to be understood that the PDA device 10 may be operatively linked to the kiosk either directly (e.g., via serial or parallel ports 42 and 44) or through wireless communication via the RF port 50 or the IR port 53. As demonstrated above, it is to be appreciated by one of ordinary skill in the art that the central server 60 of the present invention is accessible through any conventional communication channel.

Once communication has been established, the user is prompted (either by text on the user interface/display 34 or verbally through the text-to-speech converter 38 and speaker 36) to enter certain verification data (step 102). Such data is then transmitted to the central server 60 via the communication link L1. Specifically, the central server 60 may ask the user a series of questions (which are randomly chosen from the totality of questions asked and answered during the enrollment process). Such questions are received by the CPU 12 of the PDA device 10 and either displayed on the user interface display 34 or sent to the text-to-speech converter 38, where they are converted to synthesized speech and audibly transmitted to the user through the speaker 36. The central server 60 may also prompt the user to enter the PIN that was issued to the user during the enrollment process.

If such requested verification data is not provided within a predetermined time (step 104), the central server 60 will automatically disconnect the communication link L1, and a digital certificate will not be downloaded (step 106). On the other hand, if the user enters the requested verification data in timely manner (step 104), the central server 60 will process such data (step 108). The user may provide the requested verification data by providing answers to the questions by speaking into the microphone 18. The audio signals are then received by the CPU 12 and then directed to the acoustic processor module 16, wherein the user's answers are processed and transmitted to the central server 60 via the communication link L1. In addition, the user may enter his or her assigned PIN through the user interface display 34. This PIN is then processed by the DTMF processor module 56 to generate corresponding tone signals which are received and processed by the central server 60. Preferably, the PIN can be provided by stating, e.g., "My pin number is 3456" into the microphone 18, wherein the audio signals are processed by the acoustic processing module 16, and then transmitted to the central server 60 via the established communication link L1.

While the user is entering the requested verification data, the central server 60 begins processing the verification data (step 108). Specifically, the central server 60 will perform speaker verification to compare the user voice models that were processed and compiled by the CPU 12 of the PDA device 10 with the user's voice prints that were stored in the central server 60 during the enrollment process. Further, the central server 60 compares the answers given by the user with the answers provided during the enrollment process to determine if they match. The central server 60 may also verify whether the PIN entered by the user corresponds to the PIN that was issued during the enrollment process. If, after processing the verification data, the central server 60 determines that the user is not an authorized user (step 110), the communication link L1 will be disconnected and no digital certificate will be downloaded (step 106).

It is to be appreciated that any conventional speech/speaker recognition system may be employed by the present invention. The present invention is not, in any way, limited to use with or dependent on any details or methodologies of any particular speech/speaker recognition system which may be employed. Preferably, the speaker recognition system utilized by the central server 60 and the PDA device 10 in accordance with the present invention is the system which performs text-independent speaker verification and asks random questions, i.e., a combination of speech recognition, text independent speaker recognition and natural language understanding using acoustic and non-acoustic models to provide security from unauthorized access to a service/facility (i.e., the central server 60) such as disclosed in U.S. Ser. No. 08/871,784, filed on Jun. 11, 1997, and entitled: "Apparatus And Methods For Speaker Verification/Identification/Classification Employing Non-Acoustic And/Or Acoustic Models and Databases," which is commonly assigned to the assignee of the present invention and the disclosure of which is incorporated herein by reference. More particularly, the text-independent speaker verification system is preferably based on a frame-by frame feature classification as disclosed in detail in U.S. Ser. No. 08/788,471 filed on Jan. 28, 1997 and entitled: "Text Independent Speaker Recognition for Transparent Command Ambiguity Resolution And Continuous Access Control," which is commonly assigned to the present assignee and the disclosure of which is also incorporated herein by reference.

As explained in the above-incorporated reference U.S. Ser. No. 08/871,784, text-independent speaker recognition is preferred over text-dependant or text-prompted speaker recognition because text independence allows the speaker recognition function to be carried out in parallel with other speech recognition-based functions in a manner transparent to the caller. It is to be understood, however, the present invention can employ text-dependant or text-prompted speaker verification.

It is to be further appreciated that the automatic speech/speaker recognition system disclosed in U.S. Ser. No. 08/873,079, filed on Jun. 11, 1997, entitled "Portable Acoustic Interface For Remote Access to Automatic Speech/Speaker Recognition Server," which is commonly assigned to the present assignee and the disclosure of which is incorporated herein, may preferably be employed in the present invention to provide for accurate speech recognition communication in remote transactions between the PDA device 10 and the central server 60.

Particularly, as explained in above U.S. Ser. No. 08/873,079, there are certain problems associated with remote communications between a server/client systems utilizing automatic speech/speaker recognition. Such problems include the loss of accuracy of data due to degradation of voice data which is transmitted over a communication channel and the varied background noises at the user end which reduces the accuracy in speech recognition. Such problems are remedied by preprocessing the speech signals that are transmitted over the communication channel to the server. Such pre-processing includes characterizing the acoustic features of the transmitting device, the environment, the speaker and the communication channel, whereby such information is then processed by the central server to set references, select appropriate decode models and algorithms to recognize the speaker or decode the speech by modeling the channel transfer function and the background noise to reduce the word error rate of the speech or to accurately perform speaker recognition.

Referring back to FIG. 4, if, on the other hand, the user is verified (step 110), the central server 60 will then prompt the user to provide certain transaction limitations such as the specific financial card information to be used, the limit on the amount of allowed spending allowed over the lifetime of the temporary digital certificate and/or the period of time in which the temporary digital certificate will remain valid (step 112). This information is received and processed by the central server 60 and a digital certificate is then created and encoded with the user requested limitations (step 114). This digital certificate is then encrypted by the central server 60 and downloaded into the digital certificate processing module 20 of the CPU 12 via the established communication link L1 (step 116). It is to be understood that the present invention may employ any known encryption technique or algorithm for the encryption/decryption process, such as those disclosed in "Applied Cryptography," by Bruce Schenier, second edition, Wiley, 1996. The digital certificate is then stored in the memory 14 of the PDA device 10. With a valid digital certificate, the user can then perform the local operating mode of the PDA device 10.

It is to be appreciated that, as demonstrated above, the present invention may utilize PIN or password protection in addition to, or in lieu of, biometric verification to obtain the necessary digital certificate from central server 60. Moreover, the methods disclosed in the above-referenced U.S. Ser. No. 08/873,079 may be utilized in the present invention to remotely authenticate, reset or revoke the user's password, logons, PIN and/or encryption/decryption keys, whereby the user may establish communication with the central server 60 (via the PDA device 10) to request, e.g., a PIN change.

Figure 5:
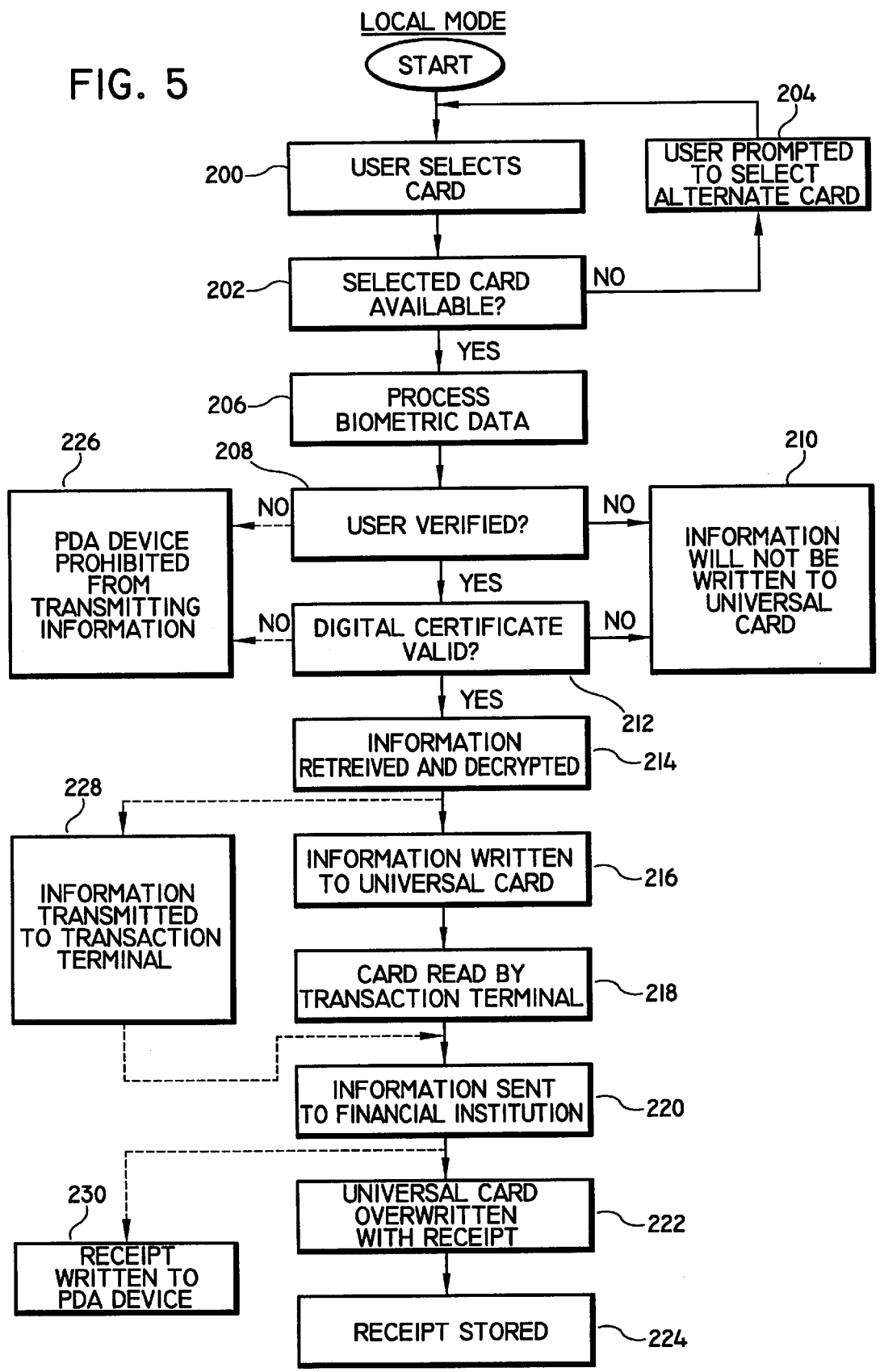
FIG. 5 is a flow diagram illustrating the local mode of operation in accordance with the present invention.

Referring now to FIGS. 1, 3 and 5, the local operating mode of the present invention is now described. The local mode of operation is commenced by the user selecting a pre-enrolled credit card that is stored in memory 14 (step 200). The selection process is preferably performed by voice activated commands (e.g., by stating into the microphone 18 "I want to use my American Express Card"). Such voice commands are then received by the CPU 12 and processed in the acoustic processor module 16. It is to be appreciated that any known command and control engine for speech recognition may be employed in the present invention such as the commercially available large vocabulary IBM VIA-VOICE GOLD system to perform the speech recognition functions in accordance with the present invention.

Alternatively, the desired card may be selected through the user interface/display 34. The CPU 12 then searches the memory 14 for the desired information (step 202). If the card was not previously stored in the PDA device 10 during the enrollment process, the user will be prompted to select another card (step 204).

If the requested card information is found in memory, biometric verification must be performed before the card information can be written to the Universal Card 26. Alternatively, as stated above, PIN or password verification by be performed in lieu of, or in addition to, biometric verification. In the preferred embodiment of the present invention using voice activated commands to select the desired card, the microphone 18 functions as a biometric sensor for receiving biometric voice data. This biometric voice data is then sent to the acoustic processor module 16 wherein such data is processed (step 206) by comparing the current biometric voice data with the user's voice models stored in memory 14. Although such verification may be performed by any conventional method, the speaker verification methods disclosed in the above-referenced applications, U.S. Ser. Nos. 08/871,784 and 08/788,471 are preferably employed in the present invention.

In another embodiment of the present invention, a biometric sensor 40 of any known type may be used in lieu of, or in conjunction with the microphone, to collect biometric data to be processed by the biometric processor module 22 using known techniques, e.g., finger, thumb or palm print data, handwriting data, a retinal vascular pattern data or a combination thereof. Again, in a further embodiment of the present invention, PIN or password verification may be utilized in lieu of, or in addition to such biometric verification techniques.

After the biometric data is processed by the acoustic processing module 16 (when voice verification is utilized) or the biometric processor module 22 (when other biometric verification methods are used), or both, a determination is made as to whether the user is an authorized user (step 208). If the user is not verified, the selected card information will not be written to the Universal Card 26 (step 210). If the user is verified, the digital certificate (previously obtained in the client/server mode) is retrieved from memory 14 and loaded into the digital certificate processor module 20. The digital certificate processor module 20 processes the digital certificate to determine whether the digital certificate is still valid (i.e., unexpired) and whether the use of the selected card has been prohibited or limited by the user requested limitations of such card during the client/server mode (step 212). If the digital certificate is not valid (i.e., expired), the selected card information will not be written to the Universal Card 26 (step 210).

If the digital certificate is valid (i.e., unexpired) the requested card information is then retrieved from memory 14 and stored in the encrypter/decrypter module 24. The selected card information is then decrypted by the encryption/decryption module 24 using an encryption key unique to the PDA device 10 (step 214). The decrypted card information is then sent to the smartcard reader/writer 30 where it is then written to the Universal Card 26 (step 216). The Universal Card 26 is then removed from the smartcard reader/writer 30 and swept through the magnetic reading device of the transaction terminal 80 (FIG. 3) (step 218). The consumer transaction information is then sent to the proper financial institution 70 via communication link L4 (step 220).

In a more advanced transaction terminal 80, the Universal Card 26 may be overwritten with a receipt of the transaction by the POS or ATM transaction terminal 80 (step 222). With this feature, the user can keep an accounting of his or her transactions by inserting the Universal Card 26 into the smartcard reader/writer 30 and then loading the receipt information into the memory 14 of the PDA device 10 (step 224). The user can subsequently transfer such information to a personal computer containing accounting software such as the software sold under the tradename QUICKEN.

Advantageously, the present invention is immediately employable with the current infrastructure since the Universal Card 26 is compatible with all credit card and/or smartcard electronic fund transfer systems (e.g., systems that process ATM cards, debit cards, credit cards, access control cards, calling cards and/or service cards).

It is to be appreciated that the present invention may be used to store and access personal information such as medical, financial information and other confidential information which may be accessed and written to the Universal Card 26 or displayed on the user interface/display 34 (assuming a valid digital certificate and local user verification). For example, medical doctors with special smartcards can access certain medical information from the PDA device of a patient (upon patient verification) by writing such information to the smartcard via the smartcard reader/writer of the PDA device 10. Alternatively, such information may be transferred by wireless communication between the PDA device of the patient and the PDA device of the doctor.

It is to be further appreciated that the invention may interact with electronic fund transfer systems or transaction terminals having wireless or direct communication capabilities without even having to use the Universal Card 26. Specifically, as demonstrated by the dotted lines in FIG. 5, the consumer transaction may be performed by transmitting the selected card information directly from the PDA device to the ATM or POS transaction terminal through an established communication link L2 (step 228, FIG. 3) (i.e., via the serial port 42, the parallel port 44 modem 42, the IR port 54 or the RF port 50), rather than retrieving and writing card information to the Universal Card 26. Further, a receipt of the transaction can be directly transmitted to the PDA device 10 through the communication link L2 (step 230). It is to be understood that in this embodiment, the CPU 12 of the PDA device 10 will prohibit the selected card information from being retrieved and transmitted to the transaction terminal 80 if the user is not biometrically verified and/or if the digital certificate is not valid (step 226). In this particular embodiment of the present invention, the PDA device 10 itself actually takes the place of the Universal Card 26 and, consequently, eliminates the need of having to first write the selected card information to the Universal Card 26 and then sweep the Universal Card 26 through the magnetic reader of the POS or ATM transaction terminal.

Advantageously, the present invention provides biometric security for transactions that do not involve electronic data transfer such as transactions that are processed with traditional mechanical credit card sweepers or transactions that are performed remotely over the telephone. In such situations, a merchant can confirm that the user passed local verification by using the unique Universal Card number 27 (FIG. 2) together with an authorization number which is based on the current valid digital certificate and generated upon user verification.

Figure 6:
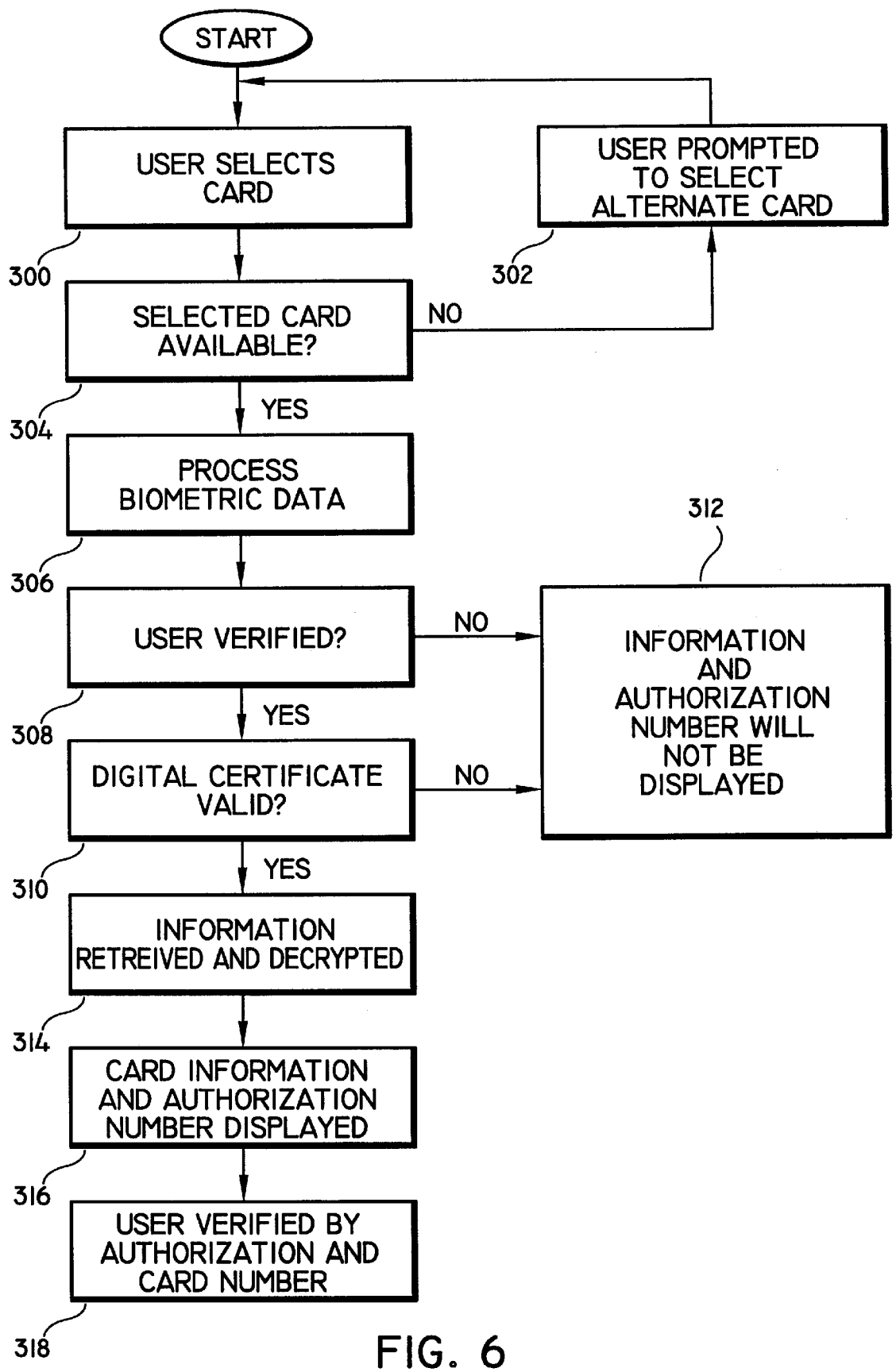
FIG. 6 is a flow diagram illustrating another local mode of operation in accordance with the present invention.

By way of example, referring to FIG. 6, a flow diagram illustrating the local mode of the PDA device 10 during a remote (or mechanical sweeper) consumer transaction is shown. When operating the PDA device 10 in the local mode, if the user is biometrically verified (step 308) and the PDA device 10 contains an unexpired digital certificate (step 310), the selected card information is retrieved from memory 14 and decrypted (step 314). The desired credit card information, as well as an authorization number, is then displayed on the user interface/display 34 (step 316). This information can then be verbally communicated to the merchant in order to process the transaction. If the user is not biometrically verified, or if the PDA device 10 contains an expired digital certificate, the selected card information and authorization number will not be displayed. (step 312).

The merchant can verify that local verification of the user has been properly obtained by establishing a communication link L3 (FIG. 3) with the central server 60. If the selected card information corresponds to a credit card that was previously enrolled (i.e., registered) with the service provider of the PDAR device 10 and Universal Card 26, upon transmitting the selected card information to the financial institution (or calling such institution to confirm the validity of the credit card), the merchant will be requested to provide the authorization number (which is generated upon user verification), in addition to the expiration date of the credit card. The merchant will then transmit the Universal Card number 27 and the displayed authorization number to the central server 60. Since the authorization number is a function of the unexpired digital certificate that was obtained from the central server 60 in the client/server mode, the central server 60 inform the merchant that the user was properly verified (step 318).

It is to be appreciated that local verification may also be performed by signature verification, whereby a digitized image of the user's valid signature is displayed on the user interface/display 34 using known techniques so that a merchant can compare the digitized signature on the screen to the user's written signature to provide further authentication. Further, the present invention may utilize any conventional pressure sensitive display wherein the user of the PDA device 10 may sign his or her signature on the display, which is then processed and compared with an authentic digitized signature stored in the memory 14 of the PDA device 10. An example of such technique is disclosed, for example, in "Automatic On-Line Signature Verification," by Vic Nalwa, Proc. IEEE, pp. 215–239, February, 1997.

It is to be further appreciated that the PDA device 10 and system of the present invention can be configured to afford an additional level of security for user verification, whereby the financial institution (e.g., credit card company) can verify the identity of the consumer during a purchase transaction. Specifically, during a consumer transaction, upon local verification (biometric, PIN and/or password) and assuming, of course, that a valid digital certificate was previously downloaded from the central server 60, the PDA device 10 can be programmed to download the selected card information in encrypted form to the Universal Card 26, as well as an encrypted file containing unique identifying information pertaining to the consumer including, but not limited to, such as the consumer's name and account number (issued by the service provider of the PDA device 10 and Universal Card 26). The selected card information, as well as the encrypted information file, would be transmitted to the POS terminal (via the Universal Card, RF or IR) and then transmitted in encrypted form directly to the processing financial institution together with the purchase details.

Similarly, for purchase transactions with remote services (e.g. via the internet with a merchant's Web site), the selected card information in encrypted form, as well as the encrypted user information, would be transmitted via modem (TCP/IP) to the remote service (i.e., Web site) and then transmitted in encrypted form to the financial institution. It is to be appreciated that the encrypted information may be transmitted to the merchant's Web site either directly from the modem 58 of the PDA device 10, or by downloading such information to the Universal Card 26, which is then read and transmitted by a PC equipped with a smartcard reader and a modem.

Next, assuming the credit card was previously enrolled with the service provider, the processing financial institution would posses the requisite key (provided by the service provider upon enrollment) to decode (i.e., decrypt) the transmitted information to verify the identity of the user. Consequently, the processing financial institution would provide an authorization number for the transaction to the merchant if the consumer was verified or, on the other hand, deny the transaction and inform the merchant if the consumer is not authorized to use the selected card. Alternatively, the PDA device 10 can be programmed to download a copy of the valid temporary digital certificate in encrypted form (as well as the selected card information in encrypted form) to the Universal Card 26, whereby the digital certificate containing the requisite information to identify the user would be transmitted (with the selected card information) to the corresponding financial institution.

The present invention has heretofore been illustrated as a separate portable device. It is to be understood by one of ordinary skill in the art that the configuration of the present invention may be embedded in other CPU based systems such as a cellular phone, a portable laptop, a network computer (NC), or a PC having built in the components of the above described PDA device 10. For example, a portable laptop having the smartcard reader/writer 30 of the PDA device 10 may be directly connected to the central server 60 through a modem or through an internet server by protocols such as TCP/IP to download a valid digital certificate.

Moreover, the functions and components of the PDA device 10 may be built into a cellular phone, whereby communication with the central server 60 may be achieved through a cellular communication channel, which may be analog or digital (e.g., CDMA, GSM, etc.).

It is to be appreciated by one of ordinary skill in the art that a special ATM, kiosk or POS terminal can be employed to perform the methods and functions of the present invention in lieu of the actual PDA device, thereby eliminating the need to physically posses the PDA device 10. For instance, a smartcard having a valid digital certificate and the user's verification data (e.g, biometric data (voice print), PIN and/or password) and card information stored thereon may be inserted into the ATM, kiosk or POS terminal, which are be equipped with biometric sensors such as a microphone. The ATM can then verify the user biometrically or via PIN or password. Assuming the digital certificate is valid, the ATM can then initialize the smartcard which may then be used to perform, for example, a purchase transaction. The smartcard may then be used for the duration of the validity of the digital certificate (i.e., until the digital certificate expires) or until another card is loaded. In this embodiment, the smartcard can be used for only a limited amount of transactions. The digital certificate may be downloaded to the smartcard by any method analogous to the PIN maintenance techniques disclosed in the above incorporated U.S. Ser. No. 08/873,079, "Portable Acoustic Interface For Remote Access to Automatic Speech/Speaker Recognition Server." For example, the user may establish a communication link with the central server 60 service provider through a personal computer having a smartcard reader, whereby a valid digital certificate may be download onto the smartcard after the user provides verification information such as user ID, PIN, smartcard serial number, and/or biometric data.

It is to be further appreciated that the PDA device 10 of the present invention may be used as a personal credit card center whereby funds may be directly transferred between individuals having such PDA devices via credit cards or debit cards. For example, assume that User A owes User B a certain amount of money. User A will perform local verification (assuming that user A has a valid digital certificate) to download selected credit card or debit card information to User A's Universal Card. User A will then provide User B with the Universal Card which is then inserted into the smartcard reader/writer 30 of the PDA device 10 of User B. User B then selects the amount of money to be transferred (i.e., debited) from the Universal Card (i.e., selected credit card) to any one of User B's enrolled financial accounts (e.g., credit card accounts). User B then obtains the authorization number produced by the PDA device of User A upon local verification, and enters such number into the PDA device of User B. Of course, the above procedure may be performed directly (e.g., via IR communication) instead of physically exchanging the Universal Card.

To prevent fraudulent transactions, the authorization number produced by the PDA device of User A must be inputted into the PDA device of User B after the amount of the transaction is entered into the PDA device of User B and verified by User A. In other words, the PDA device of User B must be configured such that the authorization number from User A will not be accepted by the PDA device of User B unless the amount of the transaction is first entered into the PDA device of User B. Moreover, the PDA device of User B must be configured such that the authorization number of User A entered into the PDA device of User B is valid for only one transaction (i.e., one amount of money entered into the PDA device of User B), whereby the entire process must be subsequently repeated for each additional transaction between User A and User B. Alternatively, to prevent fraud, the PDA device of User A may be configured such that the authorization number produced by the PDA device of User A contains the amount of money to be transferred to the account of User B in an encrypted or, otherwise, hidden form so that User B cannot access and manipulate such amount.

After entering User A's authorization number, User B will establish a communication link with the service provider to verify that the authorization number corresponds to User A's unique Universal Card number and then have the funds transferred to User B's selected account (assuming the account is registered with the service provider).

One of ordinary skill in the art can envision various methods for implementing the present invention for communicating the selected card information. For instance, in the near future, information may be communicated between individuals and systems via personal area network (PAN) which links special electronic devices having a transceiver and CPU carried on the individuals using human conductivity. Such concept may be employed in the present invention whereby the selected card information is transferred upon human contact (e.g., shaking hands) rather than being transferred through a magnetic or smartcard or wireless communication. Specifically, the present invention may be embedded into the CPU of a PAN device whereby selected card information may be transmitted to receiving devices such as ATM's and POS terminals which are equipped with the requisite software and hardware to support PAN data exchange.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A portable information and transaction processing device, comprising:
    a central processing unit;
    a memory device, operatively coupled to said central processing unit, for storing transaction information comprising one of financial information, personal information, and a combination thereof;
    communication means for establishing a communication link with a central server of a service provider, disposed at a remote location, to download a temporary digital certificate issued by said service provider;
    a user interface, operatively coupled to said central processing unit, for selecting at least a portion of said transaction information;
    a card reader;
    a universal card having a unique card number designated to a subscribing user of said service provider, wherein the universal card is inserted into said card reader to receive said selected portion of said transaction information; and
    programming means, executable by said central processing unit, for determining if said temporary digital certificate is valid, for writing said selected portion of said transaction information to said universal card if said temporary digital certificate is deemed valid, and for preventing said selected portion of said transaction information from being written to said universal card when said temporary digital certificate is deemed invalid.

2. The device according to claim 1, further comprising verification means for verifying if a user of said device is an authorized user and wherein said programming means comprises means for preventing said selected portion of said transaction information from being written to said universal card if the user of said device is not verified.

3. The device according to claim 2, wherein said verification means includes one of biometric verification means, PIN (personal identification number) verification means, and a combination thereof.

4. The device according to claim 3, wherein said biometric verification means includes: biometric sensor means for receiving biometric data from a user of said device; and biometric processing means for processing said biometric data to determine if said user of said device is an authorized user.

5. The device according to claim 4, wherein said biometric data is derived from one of a finger, thumb or palm print, a voice print, a handwriting sample and a retinal vascular patter and a combination thereof.

6. The device according to claim 4, wherein said biometric verification means performs speaker verification and said biometric data is voice data.

7. The device according to claim 6, wherein said speaker verification is text-independent speaker verification.

8. The device according to claim 1, further comprising encrypting/decrypting means, operatively coupled to said central processing unit, for encrypting said transaction information prior to said transaction information being stored in said memory device and for decrypting said selected portion of said transaction information.

9. The device according to claim 1, further comprising speech recognition means, operatively coupled to said central processing unit, for processing voice commands from an authorized user of said device.

10. The device of claim 1, wherein the temporary digital certificate includes one of an expiration date, the unique card number of the universal card, transaction limitation data, and a combination thereof.

11. An information and transaction processing system, comprising:
    a central server associated with a service provider of a subscribing user;
    a transaction terminal; and
    a portable communication device comprising:
        a central processing unit;
        a memory device, operatively coupled to said central processing unit, for storing transaction information comprising one of financial information, personal information, and a combination thereof;
        communication means for establishing a communication link with said central server to download a temporary digital certificate from said central server;

a user interface, operatively coupled to said central processing unit, for selecting at least a portion of said stored transaction information;

a card reader;

a universal card having a unique card number designated to the subscribing user by said service provider, which is inserted in said card reader to receive said selected portion of said transaction information; and programming means, executable by said central processing unit, for determining if said temporary digital certificate is valid, for writing said selected portion of the transaction information to said universal card if said temporary digital certificate is deemed valid, and for preventing said selected portion of the transaction information from being written to said universal card if said temporary digital certificate is deemed invalid;

whereby said universal card is presented to said transaction terminal for initiating a user-desired transaction if said selected transaction information is written to said universal card.

12. The system of claim 11, wherein said central server comprises verification means for receiving and processing verification data of a user of said portable device, which is transmitted from said portable device, to verify if the user of said portable device is a subscribing user, whereby said digital certificate is transmitted to said portable device only if said user is verified.

13. The system of claim 11, wherein said portable communication device further comprises verification means for verifying if a user of said portable communication device is authorized to use said portable communication device, and wherein said programming means comprises means for preventing said selected transaction information from being written to said universal card if the user of said portable communication device is not verified.

14. A method for performing an electronic transaction, comprising the steps of:

using a portable communication device to establish a communication link with a central server of a service provider;

verifying, by the central server, the identity of a user of the portable communication device to determine if the user is a subscribing user of the service provider;

downloading a temporary digital certificate from the central server to the portable communication device, the temporary digital certificate being issued by the service provider if the user is verified as a subscribing user;

selecting, by the user of said portable communication device, desired transaction information stored in the device to perform an electronic transaction;

verifying, by the portable communication device, if the user is an authorized user of said device;

determining, by the portable communication device, if the downloaded temporary digital certificate is valid; and providing the selected transaction information to an electronic transaction terminal to perform an electronic transaction, if the user is deemed an authorized user and the temporary digital certificate is deemed valid.

15. The method of claim 14, wherein the step of providing the selected transaction information to an electronic transaction terminal comprises the steps of:

retrieving said selected transaction information stored in said portable device;

decoding the selected transaction information using a key from the temporary digital certificate;

establishing a transaction communication link with said electronic transaction terminal; and transmitting said decoded transaction information over said transaction communication link to said electronic transaction terminal.

16. The method of claim 14, wherein the step of providing the selected transaction information to an electronic transaction terminal comprises the steps of:

retrieving said selected transaction information stored in said portable device;

decoding the selected transaction information using a key from the temporary digital certificate;

writing the decoded transaction information to a universal card in a card reader of the portable device; and providing the universal card with the decoded transaction information to the electronic transaction terminal.

17. The method of claim 14, further comprising the steps of:

generating an authorization number associated with the temporary digital certificate; and verifying the transaction by the transaction terminal, wherein the step of verifying the transaction comprises the steps of establishing a communication link with the central server by the electronic transaction terminal, and transmitting the authorization number and an account number of said subscribing user to said central server.

18. The method of claim 14, wherein the temporary digital certificate includes one of an expiration date, an account number of the subscribing user, transaction limitation data, and a combination thereof.

19. The method of claim 18, wherein one of the expiration date, transaction limitation data, and a combination thereof, of the temporary digital certificate is selected by the user of said portable communication device, if the user is verified by the central server as a subscribing user.

20. The method of claim 14, wherein the steps of verifying by the central server and the portable communication device are performed using one of biometric verification, PIN (personal identification number) verification, and a combination thereof.

* * * * *